(12) United States Patent
Bedetti

(10) Patent No.: US 9,403,733 B2
(45) Date of Patent: Aug. 2, 2016

(54) METHOD FOR THE GRANULATION OF UREA

(71) Applicant: Casale SA, Lugano (CH)

(72) Inventor: Gianfranco Bedetti, Lugano (CH)

(73) Assignee: Casale SA (CH)

( * ) Notice: Subject to any disclaimer, the term of this patent is extended or adjusted under 35 U.S.C. 154(b) by 0 days.

(21) Appl. No.: 14/408,892

(22) PCT Filed: Apr. 18, 2013

(86) PCT No.: PCT/EP2013/058083
§ 371 (c)(1),
(2) Date: Dec. 17, 2014

(87) PCT Pub. No.: WO2013/189625
PCT Pub. Date: Dec. 27, 2013

(65) Prior Publication Data
US 2015/0166421 A1    Jun. 18, 2015

(30) Foreign Application Priority Data

Jun. 18, 2012   (EP) .................................. 12172431

(51) Int. Cl.
*B01D 9/00* (2006.01)
*C05G 3/00* (2006.01)
*B01J 2/04* (2006.01)
*C05C 9/00* (2006.01)

(52) U.S. Cl.
CPC ............... *C05G 3/0058* (2013.01); *B01J 2/04* (2013.01); *C05C 9/00* (2013.01); *C05C 9/005* (2013.01)

(58) Field of Classification Search
CPC .......... B01D 9/00; C09K 11/08; C09K 11/66; C13K 1/10; C30B 17/00
USPC ................. 23/295 R, 296, 300, 301
See application file for complete search history.

(56) References Cited

U.S. PATENT DOCUMENTS 3,130,225 A    4/1964   Friend

FOREIGN PATENT DOCUMENTS

| EP | 0214441 A2 | 3/1987 |
| GB | 1408381 A | 10/1975 |
| WO | 2005/061088 A1 | 7/2005 |

OTHER PUBLICATIONS

International Search Report issued in connection with PCT/EP2013/058083.

*Primary Examiner* — Edward Johnson
(74) *Attorney, Agent, or Firm* — Akerman LLP

(57) ABSTRACT

Process and apparatus for granulation of a liquid phase, wherein a polydispersed flow of droplets of said liquid phase is generated, with descending motion in contact with solidification air along a substantially vertical granulation path, and wherein inside said polydispersed flow, small-sized droplets solidify producing solid particles, and said solid particles grow by collision with other droplets of liquid; in some embodiments the product obtained with this new granulation method can be grown with the conventional method.

21 Claims, 5 Drawing Sheets

METHOD FOR THE GRANULATION OF UREA

This application is a national phase of PCT/EP2013/058083, filed Apr. 18, 2013, and claims priority to EP 12172431.4, filed Jun. 18, 2012, the entire contents of both of which are hereby incorporated by reference.

FIELD OF APPLICATION

The invention concerns a method and an apparatus for the granulation of a liquid. A preferred application is represented by the granulation of urea.

PRIOR ART

It is known that in urea synthesis plants there is a need to convert liquid urea (commonly called urea melt) into a solid product.

A known technique consists of granulation in a fluid bed, in which the liquid urea is advantageously sprayed by appropriate nozzles in a bed formed of solid-state granules of urea kept in a fluid bed condition by a stream of fluidification air. The size of the granules progressively increases by means of solidification of the liquid deposited on the surface of the granules themselves.

However, it is known that a conventional fluid bed granulation process needs to be fed over time not only with liquid urea, but also with a solid phase of urea. Said solid phase consists of seeds that act as starting cores of the solidification process.

The most common method for generating the seeds consists of recirculating a part of the granulated product after suitable screening and grinding, in order to provide the seeds. It is also known to generate said seeds using a part of the available liquid. A solution of this kind, for example, consists of generating seeds in the form of small solid tablets, through suitable tablet-making machines in which droplets of liquid are deposited on a long cooled conveyor belt. All of this, however, requires a series of additional machines. In particular, tablet making machines are very large and expensive.

Another technique for converting liquid urea into a solid product, which however differs from granulation, is represented by so-called prilling. In a prilling process the liquid urea is fed to a rotating perforated basket that produces a substantially monodispersed flow of droplets of liquid inside a tower. The droplets fall by gravity along the tower and solidify by means of a counter-current air flow, producing solid particles called prills. The droplets of the monodispersed flow are substantially all the same size apart from a statistical deviation; the size of the solid prills produced by the tower corresponds to that of the droplets, i.e. it is dictated by the size of the holes of the basket.

It is known that prilling processes tend to produce a fragile product that is thus not very satisfactory. This is due to the solidification process of the droplets leaving a certain porosity in the prills. The fragility can cause the product to break up during transportation, storage, etc. especially if the product is in a bulk form.

Due to the above, the techniques of the prior art are not satisfactory and there is a strong incentive to seek a new process that overcomes these limitations.

The problems that have been outlined with reference to urea are encountered, in a similar way, in granulation processes of other liquids, for example ammonium nitrate, ammonium sulphate.

SUMMARY OF THE INVENTION

The invention provides a new process, and a relative plant, for the granulation of a liquid phase, and particularly for the granulation of urea. The invention aims to convert a flow of liquid, like for example urea melt, into a solid product with optimal size and physical characteristics, overcoming the above mentioned drawbacks of the prior art.

Said purpose is accomplished with a granulation process of a liquid phase, in which a polydispersed flow of droplets of said liquid phase is generated, with descending motion in contact with solidification air along a substantially vertical granulation path, and where inside said polydispersed flow, small-sized droplets solidify producing solid particles, and said solid particles grow by collision with other droplets of liquid.

The term polydispersed flow means that the flow of liquid droplets, initially sprayed in air, comprises droplets having a diameter that is variable in a certain range between a minimum diameter and a maximum diameter. Preferably, the flow comprises droplets of variable diameter between 0.1 mm (100 μm) and about 2.5 mm, and more preferably between 0.2 mm and 2 mm.

Such a flow of droplets can be produced, for example, with an array of nozzles. The nozzles have orifices of differentiated diameter so as to produce the polydispersed flow as desired.

The droplets of liquid phase, which progressively solidify, are under pneumatic transportation. This term means that the droplets are dispersed in air, irrespective of the relative speed between droplets and air. The "degree of vacuum" along the granulation path, for example, is substantially greater compared to a fluid bed, i.e. the solid phase is substantially more rarefied than in a fluid bed. The degree of vacuum in the flow that traverses the granulation path is for example greater than 0.9 and is generally close to 1.

The granulation path extends substantially from an inlet section, corresponding to the admission zone of the liquid droplets, to an outlet section where solid product transits.

The liquid phase fed to the process can comprise additives, if required. The addition of additives for example can be provided in the granulation of urea melt.

Other preferred features of the invention will now be listed.

At least a part of the air can be fed along said granulation path through an air-permeable wall. Said permeable wall defines at least the initial part of said path.

In some embodiments, the full liquid phase supply is introduced, in the form of said polydispersed flow of droplets, in a head section (i.e. initial section) of said granulation path.

In other embodiments, a first part of the liquid phase supply is introduced into a head section of said granulation path, and the remaining part of said liquid phase is introduced laterally in at least one intermediate section of said path. This can be done with arrays of side nozzles in addition to the head nozzles.

Feeding a part of the liquid phase laterally along the path can be appropriate depending on the desired diameter of the granules. Generally, feeding the full liquid phase through the head nozzles makes it possible to obtain granules up to a certain maximum diameter; for larger diameters the side nozzles should also be used. For example, in the granulation of urea, it is preferable to have side nozzles to obtain granules sized about 3 mm or more.

In some embodiments, the air has substantially a descending motion and therefore air and liquid droplets flow substantially in cocurrent. The droplets are preferably sprayed in the granulation path with a high speed, greater than the speed of the air. In some preferred embodiments, a flow of secondary cooling air is introduced in a substantially terminal portion of the granulation path. The introduction of said secondary air makes it possible to improve the cooling in the terminal part of the granulation path, where the primary solidification air (introduced into the upstream head section) comes with a relatively high temperature due to heat exchange with the liquid phase.

In other embodiments, the air has a substantially ascending motion, namely in counter-current with respect to the flow of liquid droplets. More preferably, a majority part of the solidification air is introduced into the granulation path with a flow entering from a lower end section of said granulation path, and a minority part of said solidification air is introduced through a porous wall that defines an upper portion of said path.

The wall defining the granulation path can be cylindrical (or polygonal), namely with a substantially constant cross section, or conical, namely with increasing or decreasing cross section.

In the embodiments where air is descending, said wall is preferably slightly conical and opening towards the bottom, i.e. base cross section of said wall is larger than top cross section. In the embodiments where air is ascending, on the other hand, a substantially conical wall (with a greater angle of conicity compared to the case of descending air) is preferred, said wall opening towards the top.

In other words, the cone formed by the wall opens towards the top or the bottom according to the direction (ascending or descending) of the air flow. Said embodiments are also applicable to variants with a polygonal wall.

The air can be fed with suitable criteria along said granulation path. In some embodiments it may be preferable to feed a greater amount of air near the admission zone of the liquid, that is close to the nozzles, where the solidification process begins. Then the air flow rate can be decreased along the granulation path. The flow rate in this case can decrease in a linear fashion or according to a different law.

Another preferred aspect consists of the reintroduction (recirculation) of the fine solid particles, with the exception of dust that can be treated in a per se known scrubber. The term fine particles means the granules that, at the end of the granulation path, do not reach the desired minimum size (e.g. smaller than 2 mm). The fine particles (simply called fines in technical literature) are separated from the larger granules, and reintroduced in the granulation path. Preferably, the fines are reintroduced through pneumatic transportation. It should be noted that recirculation of the fines is a preferred but optional feature, since it is not essential for the process of the invention.

The threshold size depends on the desired product. Generally, the finished product is given by granules having a diameter of at least 2-2.5 mm. The separation between granules and fine particles can be carried out with a sieve.

Another object of the invention is a granulation apparatus according to the attached claims.

The granulation takes place substantially in the following way. The smaller droplets inside the polydispersed flow (having a diameter close to the minimum size in the polydispersed flow, for example a few hundreds of microns) solidify quickly, slowing down with respect to the larger droplets due to contact with the air. The solid particles thus formed collide (in an inelastic manner) with other droplets belonging to the polydispersed flow, which are still in liquid state and are generally larger in size and moving at high speed. A solid particle during the descending motion in the granulation path is for example embedded by a larger droplet, which in turn solidifies, and so on obtaining granules.

It should be noted that the granulation process is self-sustaining without the introduction of solid seeds from the outside, namely without an external feed of a solid phase, and without a pre-granulation.

The fine particles (apart from dust) are reintroduced into the granulation path for growth by means of contact with other droplets of liquid. Thus, a fine particle reintroduced into the granulator tends to enlarge forming a solid particle of a greater size. A single particle can undergo several passages in the granulation path, until it forms a solid granule at least of the desired minimum size.

The substantial advantage of the invention is that it does not require feeding of solid cores (seeds) as occurs, on the other hand, in granulators of the prior art, including those with a fluid bed. The process is sustained by feeding just liquid (melt) and air, which are the only inputs of the process itself. Therefore, bulky and expensive equipments (like tablet-makers) for generating seeds are not necessary. Moreover, the process does not produce granules of excessive size as occurs, on the other hand, in fluid beds, and grinding equipments are also not necessary.

The embodiments with ascending air generally allow realizing a more compact apparatus.

In terms of the quality of the product, the invention makes it possible to obtain granules with high hardness and good uniformity of size. The applicant has noted that the process according to the invention produces solid granules of greater size compared to conventional prills, and with hardness equal to that of granules produced by fluid bed processes.

The advantages of the invention will now be illustrated with reference to some example embodiments and with the help of the figures.

FIG. 1 schematically shows an apparatus for carrying out the granulation process in accordance with one of the various embodiments of the invention, with descending air inside the granulation path.

Figure 3:
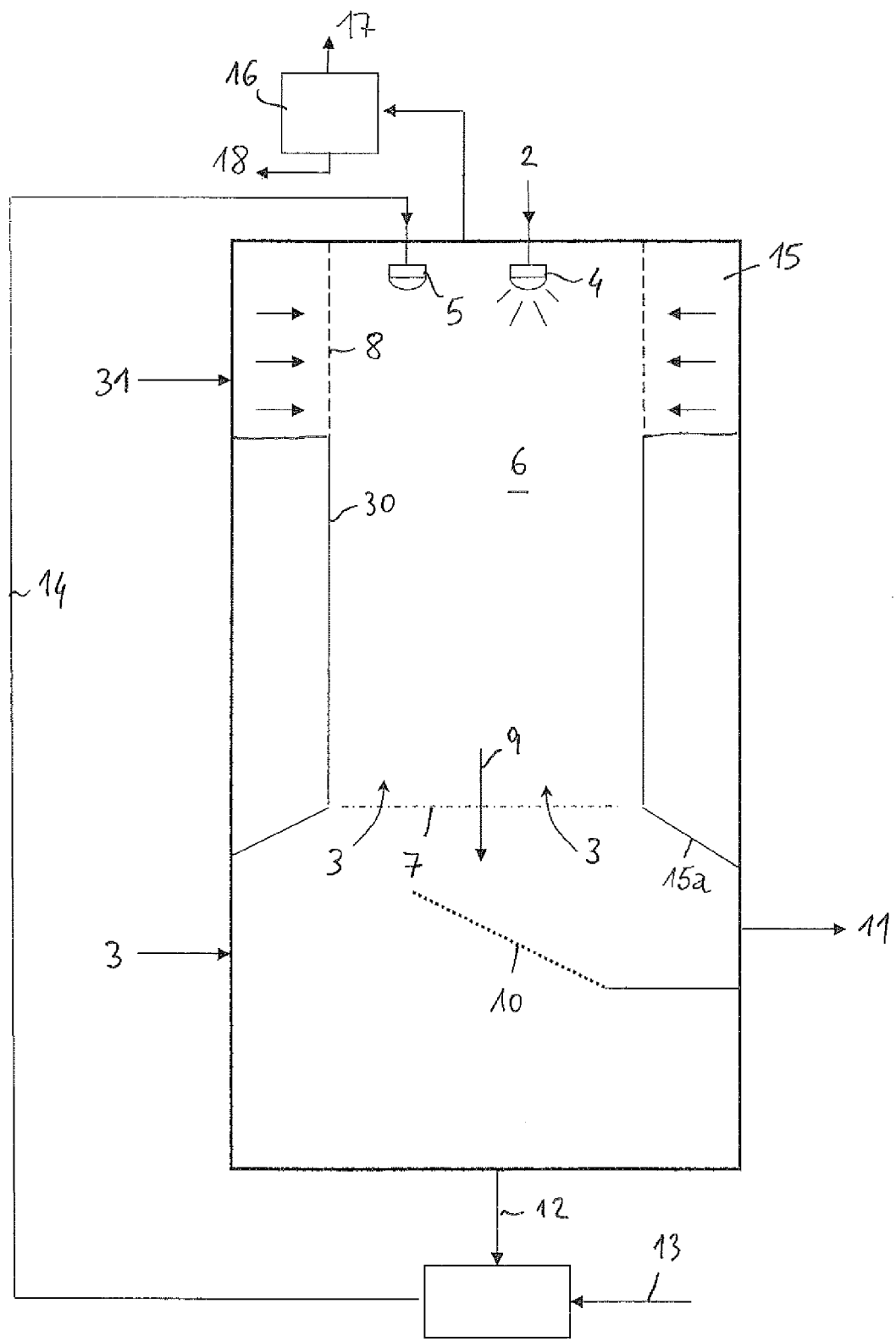
FIG. 3 shows an apparatus according to another possible embodiment, in which the air is ascending inside the granulation path.
Figure 4:
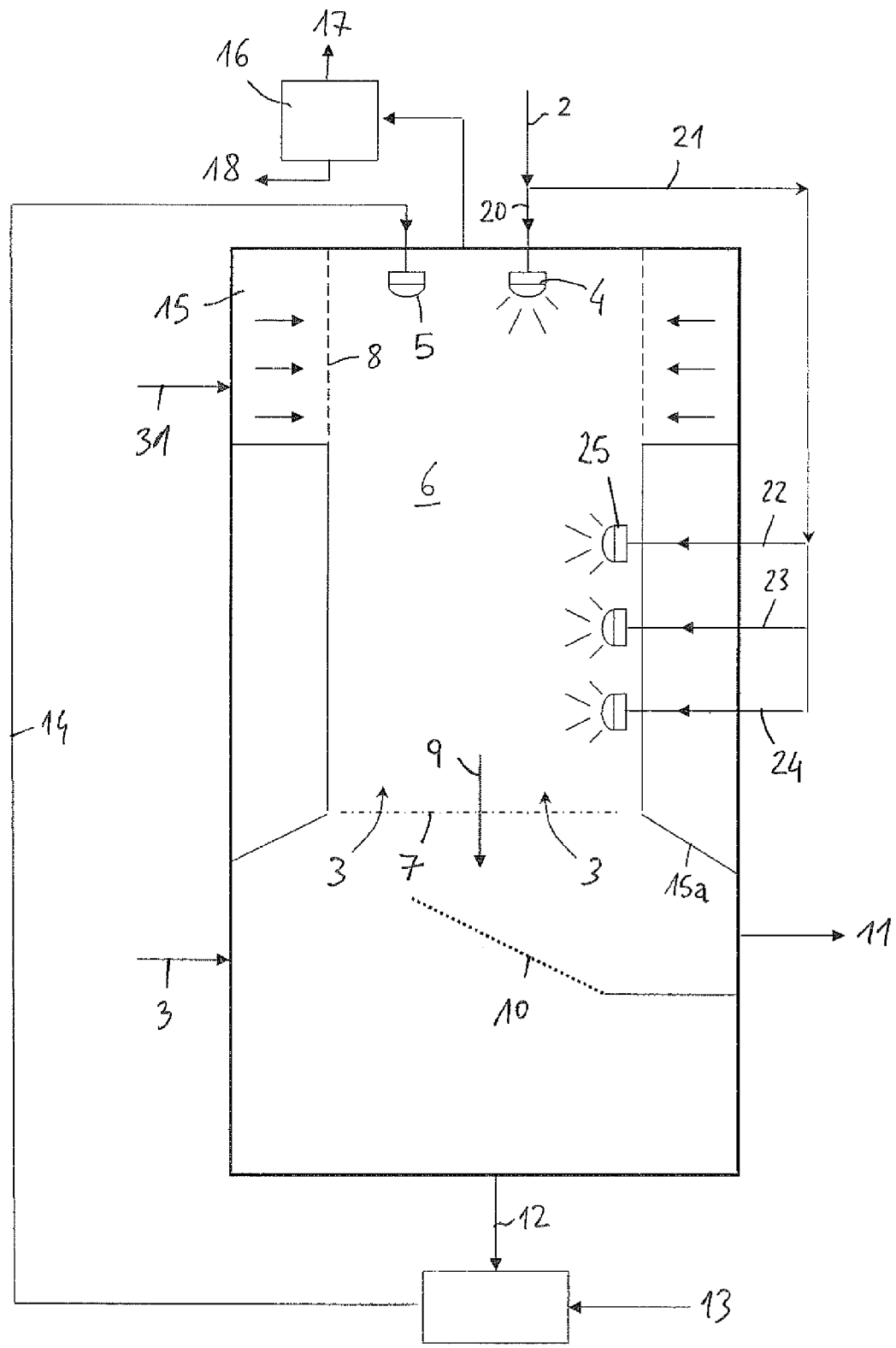
FIG. 4 shows a variant of FIG. 3 in which a part of the liquid is introduced with side nozzles.
Figure 5:
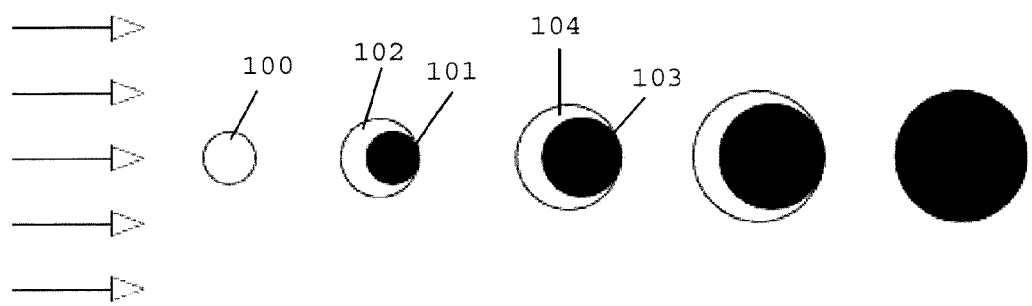

FIG. 5 schematically illustrates the process for the formation of the solid granules from the polydispersed flow of liquid droplets, as occurs for example in the apparatuses of FIGS. 1 to 4.

Figure 6:
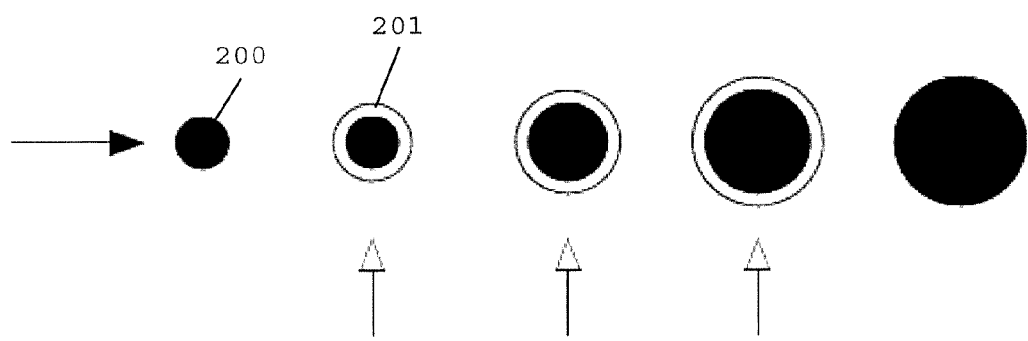
Figure 7:
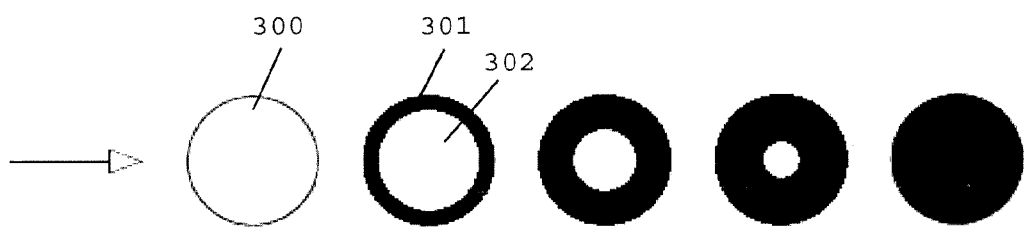

FIGS. 6 and 7 illustrate, for comparison, the processes for the formation of granules of the prior art, by granulation and prilling respectively.

DETAILED DESCRIPTION

Figure 1:
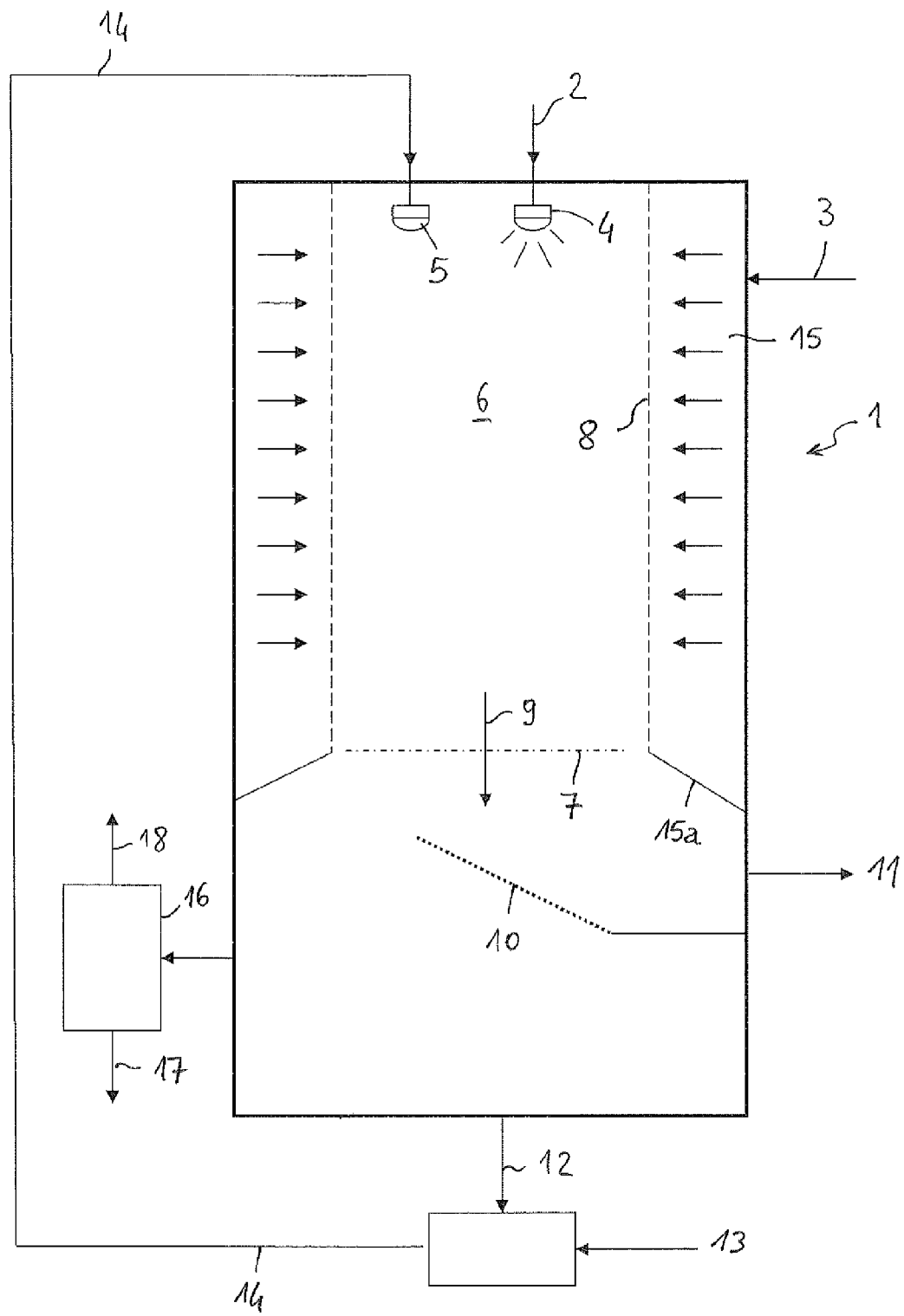

The scheme of FIG. 1 shows a vertical granulator 1 fed with a liquid phase 2 for example consisting of a urea melt, and with air 3. The liquid phase 2, in this example, comes from a urea plant made according to one of the various known techniques. Said liquid phase 2 can contain additives if necessary, based on the required product.

The liquid phase 2 is fed to an array of head nozzles 4 spraying inside the granulator, producing a polydispersed flow of droplets with a high speed, directed substantially from the top towards the bottom. In some embodiments, other head nozzles 5 are placed beside the nozzles 4, for the recirculation of the fines, as will be described hereafter.

The jet of droplets follows a granulation path 6 that substantially extends from top of the granulator 1 to an outlet section denoted by broken line 7. It should be noted that said line 7 is an imaginary line and does not correspond to a physical wall. In the example, the granulation path is represented by a column delimited by an air-permeable wall 8. Said wall 8 for example is represented by a metal wire cloth or by a grid or perforated sheet or equivalent. The wall 8 is preferably cylindrical or polygonal or slightly conical. The air 3 initially feeds an annular gap 15 between the wall 8 and an outer wall, which in the figures is represented by the outer casing of the granulator 1. The gap is closed at the bottom by a bottom wall 15a.

The air in the gap 15 is distributed in the column 6 through the permeable wall 8.

In FIG. 1 the air has a descending motion, i.e. the air that emerges from the wall 8 flows downwards and crosses the section 7 reaching the lower part of the granulator. In other embodiments that will be described hereafter (for example FIG. 3) the air has ascending motion along the path 6.

Advantageously, the expulsion speed of the droplets of liquid phase from the nozzles 4 is greater than the speed of the entering air; then inside the column 6 there is a jet of fast droplets sprayed on a slow air.

The flow of droplets produced by the nozzles 4 is substantially dispersed in air. The term of pneumatic transportation is used to denote such a state of dispersion in air.

The arrow 9 indicates the solid material coming out from the granulation path 6. A sieve 10 separates granules 11 of the desired size (e.g. larger than 2 mm and smaller than 4 mm) and fine particles (fines) denoted by line 12.

The granules 11 represent the granulation product. In some applications, the granules 11 leaving the process can be subjected to further growth with per se known technology.

The fine particles 12 (with the exception of the dust) are preferably reintroduced into the granulator 1. In the example of FIG. 1, this occurs with the help of transportation air 13 (for example through an ejector). The line 14 feeds the fines 12, carried along by the transportation air 13, to the respective array of nozzles 5.

The air extracted from the granulator 1 is preferably treated in a scrubber 16 for damping of the dust. In said scrubber 16, the dust containing air from the lower part of the granulator 1 is contacted with a liquid solution containing urea, so as to dissolve the dust and obtain a liquid recirculation solution 17 and purified air 18. The solution 17 is recirculated in the urea plant according to per se known technique.

In some embodiments, a greater flow rate of air can be sent into the inlet zone of the liquid droplets, that corresponds to the start of the solidification process. For example, referring to FIG. 1, the permeable wall 8 can be made so as to obtain a greater air flow rate near to the nozzles 4, compared to the lower region close to the outlet section 7.

In order to improve the cooling it is possible to feed a fresh cooling air stream (also called secondary air) into the lower part of the path 6. For example, the gap 15 can be optionally divided by a wall obtaining an upper gap for the inlet of primary solidification air 3, and a lower gap fed with secondary air, which is dedicated substantially to cooling the flow. The secondary air, being used for cooling but not for granulation, can also be fed with a wall having suitable holes or slits.

Figure 2:
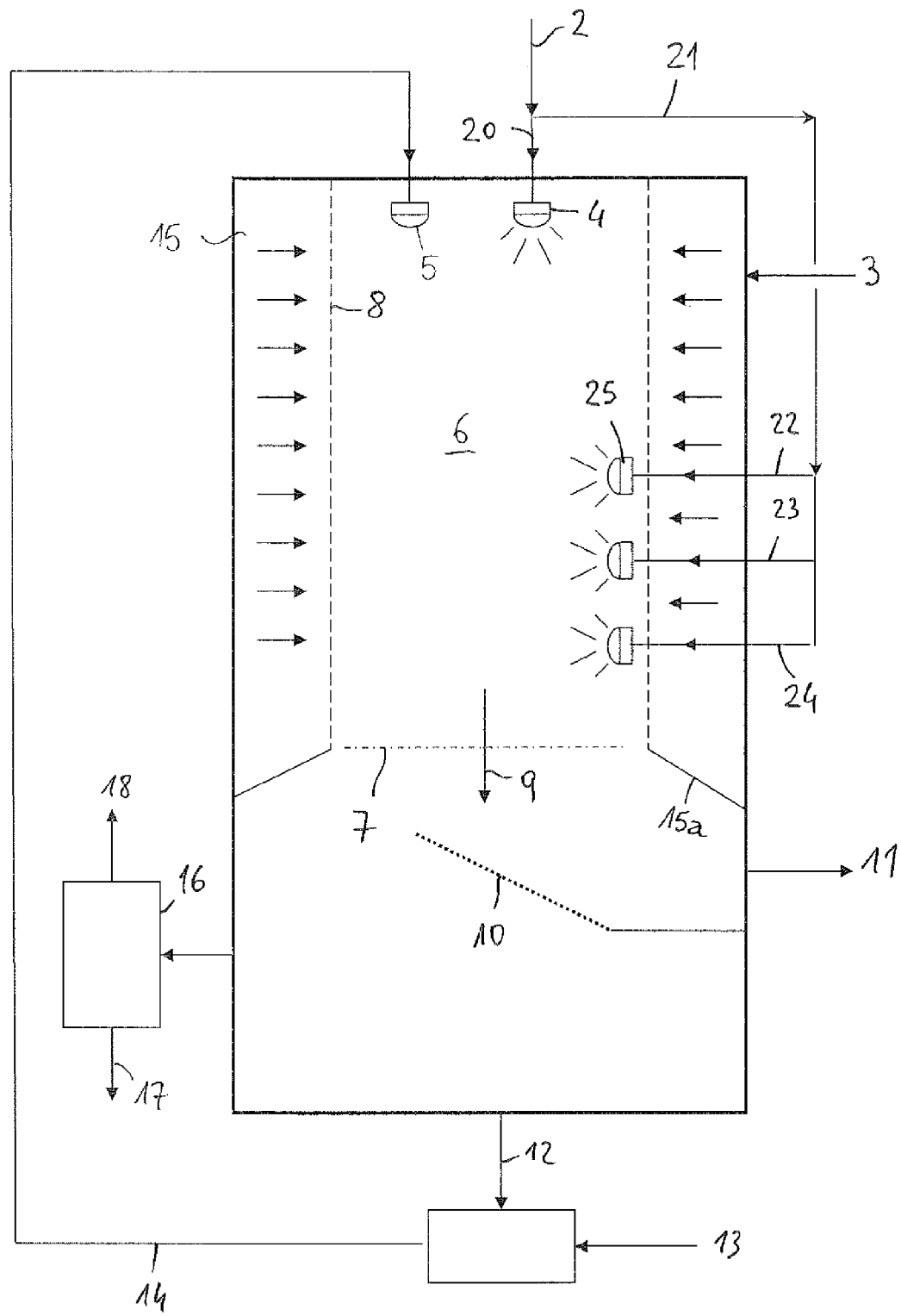
FIG. 2 shows a variant of the apparatus of FIG. 2, in which a part of the liquid is introduced with side nozzles.

FIG. 2 shows a variant of the apparatus of FIG. 1 wherein the liquid phase 2 splits into two flows 20 and 21. The flow 20 feeds the head nozzles 4; the flow 21 is directed to side nozzles 25 that are distributed along the path 6. The lines 22, 23 and 24 indicate the supply to various arrays of side nozzles, for example through distributors around the wall 8.

The side nozzles 25 may be conventional nozzles. The embodiments with side nozzles are advantageous for obtaining granules of a relevant size (e.g. over 3 mm).

In some embodiments which are preferred from the constructive point of view, the permeable wall 8 has a polygonal cross section (e.g. with 6 or 8 sides) with uprights where the side nozzles 25 are housed.

FIG. 3 shows a variant in which the air has an ascending motion inside the granulation path 6. In this case the air 3 is fed into the lower part of the granulator 1 and comes out in the upper part, to feed the scrubber 16 (if provided). As can be seen in the figures, the air 3 enters the column 6 from the lower section 7 and rises upwards.

The permeable wall 8 (and the gap 15 as well) in this example defines only the upper part of the path 6. The remaining part is defined by a non-porous wall 30. A flow of air 31 is advantageously fed through the permeable wall 8, so as to have an additional fresh air flow in the zone for introduction of the liquid adjacent to the nozzles 4. Preferably, the flow 3 contains the majority (e.g. ⅔) of the total air feed (flows 3 and 31).

In an embodiment like that of FIG. 3 the droplets of liquid and the air are in counter-current. As a non-limiting example, the liquid may have a relative speed of about 10 m/s and the air may have an ascending speed of about 6 m/s, slowing down the liquid to 4 m/s. In this way the residence time inside the granulator increases. Consequently, a configuration like that of FIG. 3 has a substantially lower height compared to the configuration of FIG. 1 or FIG. 2, for the same diameter.

FIG. 4 is similar to FIG. 3, the air 3 entering from the bottom and having with ascending motion in the granulator; in FIG. 4 the liquid is also distributed with side nozzles 25 similarly to FIG. 2.

The process of formation of a granule is schematised in FIG. 5. FIGS. 6 and 7 show, for comparison, the known processes for forming a granule (growth) obtained with fluid bed systems (FIG. 6) and prilling towers (FIG. 7).

FIG. 5 shows a small-size droplet of liquid 100 (e.g. less than 500 microns) belonging to the polydispersed flow generated by the nozzles 4. Said droplet solidifies quickly, in contact with the air, producing a small solid granule 101. Meanwhile, other larger droplets are still in liquid state. The solid granule tends to slow down in the flow and collides with a droplet, for example with a larger and faster droplet 102, forming a larger solid 103. The solid 103 thus formed collides in turn with a droplet of liquid 104 of an even larger size, and so on obtaining a granule as shown by the sequence of FIG. 5.

The man skilled in the art can appreciate that the process is completely different from the prior art. Conventional fluid bed granulation (FIG. 6) starts from a solid seed 200, as depicted in FIG. 6, on which thin layers of liquid 201 are deposited and solidify, causing a growth as shown in the sequence of FIG. 6. The prilling process (FIG. 7), on the other hand, starts with a droplet of liquid 300 of a size substantially equal to the desired solid. By means of the contact with air, the droplet starts to solidify forming firstly a thin solid crust 301 around a liquid core 302; the solidification continues reaching the core, producing a solid that, however, proves to be porous and fragile. The invention, on the other hand, obtains a solid with the same mechanical properties as the granules from a fluid bed, whilst still having the advantage of simpler equipments and without the need of seeds.

In the embodiments that comprise side nozzles, like in FIG. 2 and in FIG. 4, the process of FIG. 5 takes place substantially in the upper part of the granulator 1. In the lower part of the granulator, where the previously formed solid granules (formed with the aforementioned process of FIG. 5) are hit by the liquid droplets sprayed by the side nozzles, a growth process is carried out where a layer of liquid is deposited on the granule and solidifies increasing its diameter. In other words, the formation process of FIG. 6 is substantially obtained in the lower part of the granulator. In the embodiments where the melt is introduced only with the head nozzles, like for example in FIG. 1 or in FIG. 3, only the formation process of FIG. 5 is carried out.

For the granulation of urea, the melt 2 has a concentration of urea preferably equal to 96% or more, whereas the solid granules have a higher concentration, for example of 99.8 or 99.9%. In some embodiments of the invention, a first flow of urea melt is available with a relatively low concentration, which shall be read as a concentration of less than 99% but nevertheless a high concentration, for example of about 95% or more, and a second flow is available with an even higher concentration, over 99% and preferably >99.5% (for example 99.7%). In this case the first flow advantageously feeds the head nozzles 4 and the second flow, with a concentration of over 99%, advantageously feeds the side nozzles 25.

The invention claimed is:

1. A process of granulation of a liquid phase, the process comprising generating a polydispersed flow of droplets of said liquid phase, with a descending motion in contact with solidification air along a substantially vertical granulation path,
wherein inside said polydispersed flow, small-sized droplets solidify producing solid particles, and said solid particles grow by collision with other droplets of liquid; and
wherein the liquid phase comprises urea or is represented by a urea solution.

2. The process according to claim 1, wherein said polydispersed flow of droplets of the liquid phase comprises droplets having a characteristic size or diameter that is variable in a range between 0.1 mm and about 2.5 mm.

3. The process according to claim 1, comprising feeding at least a part of the air along said granulation path through an air-permeable wall, wherein said permeable wall delimits at least the initial part of said path.

4. The process according to claim 1, comprising introducing the entire liquid phase supply, in the form of said polydispersed flow of droplets, into a head section of said granulation path.

5. The process according to claim 1, comprising introducing a part of the liquid phase supply into a head section of said granulation path, and introducing the remaining part of said liquid phase into at least one intermediate section of said path.

6. The process according to claim 1, wherein the solidification air flows with descending motion substantially in co-current with the droplets of liquid along said granulation path.

7. The process according to claim 6, comprising introducing a flow of secondary cooling air, in addition to said solidification air, into a substantially terminal portion of the granulation path.

8. The process according to claim 1, wherein the solidification air flows with ascending motion substantially in counter-current with respect to the droplets of liquid along said granulation path.

9. The process according to claim 8, wherein a majority part of the solidification air is introduced into the granulation path with a flow entering from the lower end section of said granulation path, and a minority part of said solidification air is introduced through a porous wall that defines an upper portion of said path.

10. The process according to claim 1, comprising screening the solid material obtained at the end of said granulation path, obtaining solid granules of a size at least equal to a predetermined threshold, and fine solid particles of a size below said threshold, wherein said fine particles are reintroduced into the granulation path.

11. The process according to claim 10, wherein the fine particles are reintroduced into the granulation path with pneumatic transportation.

12. The process according to claim 1, comprising treating dust-containing air extracted from the granulation path in a scrubber obtaining a recirculation solution.

13. The process according to claim 1 wherein the urea solution fed to the head section of the granulation path has a concentration about 95% or more.

14. The process according to claim 13, wherein a second flow of urea melt is introduced into an intermediate section of said granulation path, said second flow having preferably a concentration greater than 99% and more preferably about 99.7%.

15. An apparatus for the granulation of a liquid phase according to the process of claim 1, comprising:
a substantially tubular and vertical wall that defines a granulation column inside the apparatus;
an array of head nozzles that are supplied with at least part of said liquid phase, said nozzles being positioned on top of said column and arranged to generate a polydispersed flow of liquid droplets, with descending motion inside the column; and
means for distributing solidification air in said granulation column.

16. The apparatus according to claim 15, wherein at least an upper portion of said wall is air-permeable, and at least part of the solidification air is supplied into a gap between said wall and an outer wall or casing, so that the air emerges inside the column through said permeable wall.

17. The apparatus according to claim 16, wherein said at least one portion of air-permeable wall is made with a fine metal grid or a metal wire cloth or a perforated sheet.

18. The apparatus according to claim 15, comprising at least a second array of supplementary side nozzles, which are arranged to inject an amount of liquid phase laterally along said column.

19. The apparatus according to claim 18, wherein said vertical wall has a polygonal section comprising a plurality of faces and supporting uprights, said side nozzles being mounted on said uprights.

20. The apparatus according to claim 15, said vertical wall being substantially cylindrical or conical or tapered.

21. The process according to claim 2, wherein said polydispersed flow of droplets of the liquid phase comprises droplets having a characteristic size or diameter that is variable in a range between 0.2 mm and 2 mm.

* * * * *